(12) United States Patent
Liang et al.

(10) Patent No.: US 10,432,579 B2
(45) Date of Patent: Oct. 1, 2019

(54) INTERNET PROTOCOL ADDRESS ALLOCATION METHOD AND ROUTER

(71) Applicant: Huawei Technologies Co., Ltd., Shenzhen (CN)

(72) Inventors: Jian Liang, Wuhan (CN); Jin Li, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/556,553

(22) PCT Filed: May 29, 2015

(86) PCT No.: PCT/CN2015/080206
§ 371 (c)(1),
(2) Date: Sep. 7, 2017

(87) PCT Pub. No.: WO2016/191906
PCT Pub. Date: Dec. 8, 2016

(65) Prior Publication Data
US 2018/0054415 A1 Feb. 22, 2018

(51) Int. Cl.
*H04L 29/12* (2006.01)
*H04L 12/54* (2013.01)
(Continued)

(52) U.S. Cl.
CPC ...... *H04L 61/2015* (2013.01); *H04L 12/5691* (2013.01); *H04L 45/52* (2013.01);
(Continued)

(58) Field of Classification Search
None
See application file for complete search history.

(56) References Cited

U.S. PATENT DOCUMENTS 6,240,513 B1 * 5/2001 Friedman ............... H04L 29/06
713/152
2003/0120766 A1 * 6/2003 Ishiyama ............ H04L 12/2856
709/223
(Continued)

FOREIGN PATENT DOCUMENTS

CN 1879425 A 12/2006
CN 101572692 A 11/2009
(Continued)

OTHER PUBLICATIONS

Foreign Communication From A Counterpart Application, Korean Application No. 10-2017-7026824, Korean Office Action dated May 18, 2018, 5 pages.
(Continued)

*Primary Examiner* — Hassan A Phillips
*Assistant Examiner* — Gautam Sharma
(74) *Attorney, Agent, or Firm* — Fish & Richardson P.C.

(57) ABSTRACT

Embodiments of the present disclosure provide an Internet Protocol address allocation method and a router. The Internet Protocol address allocation method of the present disclosure includes receiving a delegate prefix of an upper-level network device, where the upper-level network device is a network device connected to a wide area network interface of the router; generating a local prefix of the router and a delegate prefix of the router according to the delegate prefix of the upper-level network device; and sending the local prefix of the router and the delegate prefix of the router to a lower-level router of the router. Internet Protocol addresses of devices in a cascaded network can be obtained in the embodiments of the present disclosure.

16 Claims, 5 Drawing Sheets

A router receives a delegate prefix of an upper-level network device sent by the upper-level network device, where the upper-level network device is a network device connected to a WAN interface of the router — S201

The router generates a local prefix of the router and a delegate prefix of the router according to the delegate prefix of the upper-level network device — S202

The router sends the local prefix of the router and the delegate prefix of the router to a lower-level router of the router, where the lower-level router is a router connected to a LAN interface of the router; the local prefix of the router is used to enable the lower-level router to determine an IP address of a WAN interface of the lower-level router; and the delegate prefix of the router is used to enable the lower-level router to generate a local prefix of the lower-level router — S203

(51) Int. Cl.
*H04L 12/781* (2013.01)
*H04L 12/773* (2013.01)

(52) U.S. Cl.
CPC .......... *H04L 61/6059* (2013.01); *H04L 45/60* (2013.01); *H04L 61/6068* (2013.01)

(56) References Cited

U.S. PATENT DOCUMENTS

| | | | |
|---|---|---|---|
| 2003/0182445 A1* | 9/2003 | Smith | H04L 29/12009 709/238 |
| 2004/0019664 A1* | 1/2004 | Le | H04L 2/12018 709/220 |
| 2004/0088544 A1* | 5/2004 | Tariq | H04L 63/0435 713/162 |
| 2004/0205235 A1 | 10/2004 | Matsuhira | |
| 2004/0246931 A1* | 12/2004 | Thubert | H04L 29/12283 370/338 |
| 2005/0047348 A1* | 3/2005 | Suzuki | H04L 29/12207 370/252 |
| 2005/0099971 A1 | 5/2005 | Droms et al. | |
| 2006/0002406 A1 | 1/2006 | Ishihara et al. | |
| 2006/0159086 A1 | 7/2006 | Bras et al. | |
| 2007/0030855 A1* | 2/2007 | Ribiere | H04L 12/5692 370/401 |
| 2007/0160051 A1* | 7/2007 | Huang | H04L 29/1232 370/392 |
| 2008/0228940 A1* | 9/2008 | Thubert | H04L 29/12207 709/238 |
| 2008/0259925 A1 | 10/2008 | Droms et al. | |
| 2008/0307516 A1* | 12/2008 | Levy-Abegnoli | H04L 45/00 726/9 |
| 2011/0317711 A1 | 12/2011 | Droms et al. | |
| 2012/0314617 A1 | 12/2012 | Erichsen et al. | |
| 2013/0272306 A1* | 10/2013 | Niu | H04L 29/12915 370/392 |
| 2014/0167979 A1 | 6/2014 | Soma et al. | |
| 2014/0215038 A1* | 7/2014 | Donley | H04L 61/2015 709/223 |
| 2014/0355609 A1* | 12/2014 | Riddel | H04L 45/02 370/392 |
| 2015/0358278 A1* | 12/2015 | Albrecht | H04L 61/2092 709/245 |

FOREIGN PATENT DOCUMENTS

| | | |
|---|---|---|
| JP | 2004096287 A | 3/2004 |
| JP | 2014120918 A | 6/2014 |
| WO | 2014058488 A1 | 4/2014 |

OTHER PUBLICATIONS

Foreign Communication From A Counterpart Application, Korean Application No. 10-2017-7026824, English Translation of Korean Office Action dated May 18, 2018, 4 pages.
Machine Translation and Abstract of Chinese Publication No. CN101572692, dated Nov. 4, 2009, 23 pages.
Foreign Communication From A Counterpart Application, PCT Application No. PCT/CN2015/080206, English Translation of International Search Report dated Feb. 19, 2016, 2 pages.
Foreign Communication From A Counterpart Application, European Application No. 15893570.0, Extended European Search Report dated Feb. 26, 2018, 8 pages.
Japanese Office Action issued in Japanese Application No. 2017-567514 dated Sep. 25, 2018, 8 pages.
European Office Action issued in European Application No. 15893570 dated Mar. 7, 2019, 35 pages.

* cited by examiner

| A BAS determines a local prefix of the BAS and a delegate prefix of the BAS according to an RA message sent by a first router | ~ S501 |

| The BAS adds the local prefix of the BAS to an RA message or an IA_NA message of a DHCP and sends the local prefix of the BAS to the first router, and adds the delegate prefix of the BAS to an IA_PD message of the DHCP and sends the delegate prefix of the BAS to the first router | ~ S502 |

| The first router generates an IP address of a WAN interface of the first router according to the local prefix of the BAS | ~ S503 |

| If the first router starts a cascade mode, the first router configures a next bit of a lowest bit of the delegate prefix of the BAS to be a bit value 0, and adds a random value after the next bit of the lowest bit of the delegate prefix of the BAS to obtain a local prefix of the first router, so that a quantity of bits in the local prefix of the first router is equal to a quantity of bits in a prefix of an EUI | ~ S504 |

| The first router configures the next bit of the lowest bit of the delegate prefix of the BAS to be a bit value 1, and increases a quantity of bits in the delegate prefix of the BAS by one, to obtain the delegate prefix of the first router | ~ S505 |

| The first router generates an IP address of a first terminal according to the local prefix of the first router | ~ S506 |

| The first router adds the local prefix of the first router to an RA message or an IA_NA message of a DHCP and sends the local prefix of the first router to a second router, and adds the delegate prefix of the first router to an IA_PD message of the DHCP and sends the delegate prefix of the first router to the second router | ~ S507 |

| The second router generates an IP address of a WAN interface of the second router according to the local prefix of the first router | ~ S508 |

| If the second router starts a cascade mode, the second router configures a next bit of a lowest bit of the delegate prefix of the first router to be a bit value 0, and adds a random value after the next bit of the lowest bit of the delegate prefix of the first router so as to obtain a local prefix of the second router, so that a quantity of bits in the local prefix of the second router is equal to the quantity of bits in the prefix of the EUI | ~ S509 |

| The second router configures the next bit of the lowest bit of the delegate prefix of the first router to be a bit value 1, and increases the quantity of bits in the delegate prefix of the first router by one, to obtain a delegate prefix of the second router | ~ S510 |

| The second router generates an IP address of a second terminal according to the local prefix of the second router | ~ S511 |

| The second router adds the local prefix of the second router to an RA message or an IA_NA message of a DHCP and sends the local prefix of the second router to a third router | ~ S512 |

| The third router generates an IP address of a WAN interface of the third router according to the local prefix of the second router | ~ S513 |

INTERNET PROTOCOL ADDRESS ALLOCATION METHOD AND ROUTER

CROSS-REFERENCE TO RELATED APPLICATIONS

This application is a national stage of International Application No. PCT/CN2015/080206, filed on May 29, 2015, which is hereby incorporated by reference in its entirety.

TECHNICAL FIELD

Embodiments of the present disclosure relate to communications technologies, and in particular, to an Internet Protocol address allocation method and a router.

BACKGROUND

With continuous development of Internet technologies, the Internet Protocol is also continuously updating. With the update of the Internet Protocol, a networking method is also continuously updating. In networking of the Internet Protocol Version 6 (IPv6), a networking method of connecting a broadband access server (BAS) to a router and connecting the router to a terminal is often used.

In an existing IPv6 network, the BAS may configure a server local prefix and a server delegate prefix for an interface service of the router connected to the BAS. The BAS may configure, according to the server local prefix, an Internet Protocol (IP) address for a wide area network (WAN) interface that is on the router and that is connected to the BAS. The BAS may send the server local prefix and the server delegate prefix to the router. The router may generate a local prefix of the router according to the server delegate prefix and obtain an IP address of a local area network (LAN) interface of the router according to the local prefix of the router, that is, an IP address of the terminal connected to the router. The router also obtains an IP address of the WAN interface of the router according to the server local prefix.

For an enterprise user or a large laboratory, generally there is only one ingress router connected to the Internet by using the BAS. Access of multiple terminals of different local area networks can be implemented by connecting routers to the ingress router to form a cascaded network. For a prefix obtaining method in the IPv6 network, the ingress router may obtain only one server delegate prefix from the BAS, that is, the ingress router has only one router local prefix. Therefore, in a cascaded network, a device connected to a cascaded router cannot obtain an IP address.

SUMMARY

Embodiments of the present disclosure provide an Internet Protocol address allocation method and a router, so as to allocate IP addresses to devices in a cascaded network.

According to a first aspect, an embodiment of the present disclosure provides an Internet Protocol address allocation method, including receiving, by a router, a delegate prefix of an upper-level network device sent by the upper-level network device, where the upper-level network device is a network device connected to a WAN interface of the router; generating, by the router, a local prefix of the router and a delegate prefix of the router according to the delegate prefix of the upper-level network device; and sending, by the router, the local prefix of the router and the delegate prefix of the router to a lower-level router of the router, where the lower-level router is a router connected to a LAN interface of the router; the local prefix of the router is used to enable the lower-level router to determine an IP address of a WAN interface of the lower-level router; and the delegate prefix of the router is used to enable the lower-level router to generate a local prefix of the lower-level router.

According to the first aspect, in a first possible implementation manner of the first aspect, the upper-level network device is a BAS or a router connected to the WAN interface of the router.

According to the first aspect or the first possible implementation manner of the first aspect, in a second possible implementation manner, the generating, by the router, a local prefix of the router and a delegate prefix of the router according to the delegate prefix of the upper-level network device includes if the router starts a cascade mode, generating, by the router, the local prefix of the router and the delegate prefix of the router according to the delegate prefix of the upper-level network device.

According to the second possible implementation manner of the first aspect, in a third possible implementation manner, the generating, by the router, a local prefix of the router and a delegate prefix of the router according to the delegate prefix of the upper-level network device includes configuring, by the router, a next bit of a lowest bit of the delegate prefix of the upper-level network device to be a first bit value and adding a random value after the next bit to obtain the local prefix of the router, so that a quantity of bits in the local prefix of the router is equal to a quantity of bits in a prefix of an end-system unique identifier (EUI); and configuring, by the router, the next bit to be a second bit value and increasing the quantity of bits in the delegate prefix of the upper-level network device by one to obtain the delegate prefix of the router, where the first bit value is different from the second bit value.

According to the third possible implementation manner of the first aspect, in a fourth possible implementation manner, the quantity of bits in the delegate prefix of the upper-level network device is less than the quantity of bits in the prefix of the EUI.

According to a second aspect, an embodiment of the present disclosure further provides a router, including a receiving module configured to receive a delegate prefix of an upper-level network device sent by the upper-level network device, where the upper-level network device is a network device connected to a WAN interface of the router; a generation module configured to generate a local prefix of the router and a delegate prefix of the router according to the delegate prefix of the upper-level network device; and a sending module configured to send the local prefix of the router and the delegate prefix of the router to a lower-level router of the router, where the lower-level router is a router connected to a LAN interface of the router; the local prefix of the router is used to enable the lower-level router to determine an IP address of a WAN interface of the lower-level router; and the delegate prefix of the router is used to enable the lower-level router to generate a local prefix of the lower-level router.

According to the second aspect, in a first possible implementation manner of the second aspect, the upper-level network device is a BAS or a router connected to the WAN interface of the router.

According to the second aspect or the first possible implementation manner of the second aspect, in a second possible implementation manner, the generation module is further configured to if the router starts a cascade mode, generate the local prefix of the router and the delegate prefix of the router according to the delegate prefix of the upper-level network device.

According to the second possible implementation manner of the second aspect, in a third possible implementation manner, the generation module is further configured to configure a next bit of a lowest bit of the delegate prefix of the upper-level network device to be a first bit value, and add a random value after the next bit to obtain the local prefix of the router, so that a quantity of bits in the local prefix of the router is equal to a quantity of bits in a prefix of an EUI; and configure the next bit to be a second bit value and increase the quantity of bits in the delegate prefix of the upper-level network device by one to obtain the delegate prefix of the router, where the first bit value is different from the second bit value.

According to the third possible implementation manner of the second aspect, in a fourth possible implementation manner, the quantity of bits in the delegate prefix of the upper-level network device is less than the quantity of bits in the prefix of the EUI.

According to a third aspect, an embodiment of the present disclosure further provides a router, including a receiver, a processor, and a transmitter, where the receiver is configured to receive a delegate prefix of an upper-level network device sent by the upper-level network device, where the upper-level network device is a network device connected to a WAN interface of the router; the processor is configured to generate a local prefix of the router and a delegate prefix of the router according to the delegate prefix of the upper-level network device; and the transmitter is configured to send the local prefix of the router and the delegate prefix of the router to a lower-level router of the router, where the lower-level router is a router connected to a LAN interface of the router; the local prefix of the router is used to enable the lower-level router to determine an IP address of a WAN interface of the lower-level router; and the delegate prefix of the router is used to enable the lower-level router to generate a local prefix of the lower-level router.

According to the third aspect, in a first possible implementation manner of the third aspect, the upper-level network device is a BAS or a router connected to the WAN interface of the router.

According to the third aspect or the first possible implementation manner of the third aspect, in a second possible implementation manner, the processor is further configured to if the router starts a cascade mode, generate the local prefix of the router and the delegate prefix of the router according to the delegate prefix of the upper-level network device.

According to the second possible implementation manner of the third aspect, in a third possible implementation manner, the processor is further configured to configure a next bit of a lowest bit of the delegate prefix of the upper-level network device to be a first bit value, and add a random value after the next bit to obtain the local prefix of the router, so that a quantity of bits in the local prefix of the router is equal to a quantity of bits in a prefix of an EUI; and configure the next bit to be a second bit value and increase the quantity of bits in the delegate prefix of the upper-level network device by one to obtain the delegate prefix of the router, where the first bit value is different from the second bit value.

According to the third possible implementation manner of the third aspect, in a fourth possible implementation manner, the quantity of bits in the delegate prefix of the upper-level network device is less than the quantity of bits in the prefix of the EUI.

According to a fourth aspect, an embodiment of the present disclosure further provides a computer readable storage medium, including at least one program, where the at least one program includes a computer readable instruction; the computer readable instruction is configured to be invoked and executed by a processor of a router, so as to receive a delegate prefix of an upper-level network device sent by the upper-level network device, generate a local prefix of the router and a delegate prefix of the router according to the delegate prefix of the upper-level network device, and send the local prefix of the router and the delegate prefix of the router to a lower-level router of the router, where the upper-level network device is a network device connected to a WAN interface of the router; the lower-level router is a router connected to a LAN interface of the router; the local prefix of the router is used to enable the lower-level router to determine an IP address of a WAN interface of the lower-level router; and the delegate prefix of the router is used to enable the lower-level router to generate a local prefix of the lower-level router.

According to the fourth aspect, in a first possible implementation manner of the fourth aspect, the upper-level network device is a BAS or a router connected to the WAN interface of the router.

According to the fourth aspect or the first possible implementation manner of the fourth aspect, in a second possible implementation manner, the computer readable instruction is further configured to be invoked and executed by the processor of the router if the router starts a cascade mode, so as to generate the local prefix of the router and the delegate prefix of the router according to the delegate prefix of the upper-level network device.

According to the second possible implementation manner of the fourth aspect, in a third possible implementation manner, the computer readable instruction is further configured to be invoked and executed by the processor of the router, so as to configure a next bit of a lowest bit of the delegate prefix of the upper-level network device to be a first bit value, and add a random value after the next bit to obtain the local prefix of the router, so that a quantity of bits in the local prefix of the router is equal to a quantity of bits in a prefix of an EUI; and configure the next bit to be a second bit value and increase the quantity of bits in the delegate prefix of the upper-level network device by one to obtain the delegate prefix of the router, where the first bit value is different from the second bit value.

According to the third possible implementation manner of the fourth aspect, in a fourth possible implementation manner, the quantity of bits in the delegate prefix of the upper-level network device is less than the quantity of bits in the prefix of the EUI.

In the Internet Protocol address allocation method, the router, and the computer readable storage medium according to the embodiments of the present disclosure, the router may receive a delegate prefix of an upper-level network device sent by the upper-level network device, where the upper-level network device is a network device connected to a WAN interface of the router, generate a local prefix of the router and a delegate prefix of the router according to the delegate prefix of the upper-level network device, and send the local prefix of the router and the delegate prefix of the router to a lower-level router of the router, that is, a router connected to a LAN interface of the router. Because the local prefix of the router may be used to enable the lower-level router to determine an IP address of the WAN interface of the lower-level router, and the delegate prefix of the router is used to enable the lower-level router to determine an IP address of a terminal connected to the LAN interface of the lower-level router, IP addresses of devices in a cascaded network are obtained.

BRIEF DESCRIPTION OF DRAWINGS

To describe the technical solutions in the embodiments of the present disclosure or in previous approaches more clearly, the following briefly describes the accompanying drawings for describing the embodiments or previous approaches. The accompanying drawings in the following description show some embodiments of the present disclosure, and a person of ordinary skill in the art may still derive other drawings from these accompanying drawings without creative efforts.

FIG. 5 is a flowchart of an Internet Protocol address allocation method according to Embodiment 3 of the present disclosure;

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
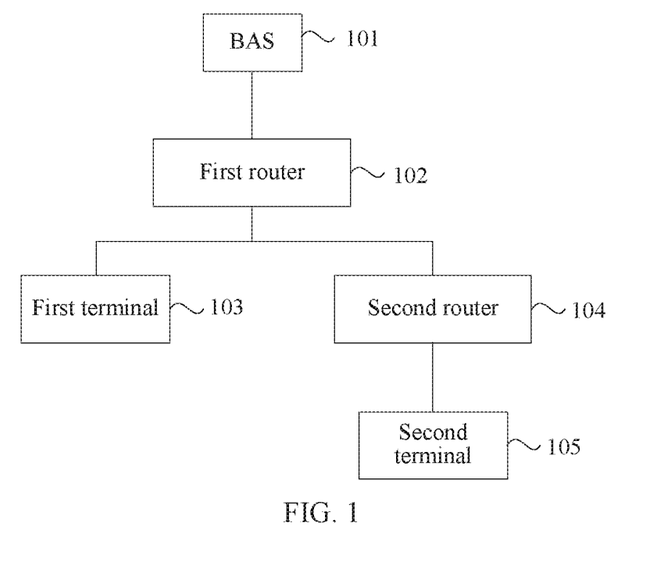
FIG. 1 is a schematic structural diagram of an IPv6 cascaded network to which an embodiment of the present disclosure is applicable.

Embodiments of the present disclosure are applicable to an IPv6 cascaded network. A router in the IPv6 cascaded network may be directly connected to a terminal, or may be connected to a terminal by using a relay device, or may be connected to a terminal by using another router. The another router may be referred to as a cascaded router. FIG. 1 is a schematic structural diagram of IPv6 cascaded network to which an embodiment of the present disclosure is applicable. As shown in FIG. 1, in the IPv6 cascaded network, a first router 102 connected to a BAS 101 may be referred to as an ingress router. The first router 102 is connected to the BAS 101 by using a WAN interface (not shown). The first router 102 is connected to a first terminal 103 by using a LAN interface, and the first router 102 is also connected to a second router 104 by using a LAN interface (not shown). The second router 104 is a cascaded router. The first router 102 may be connected to a WAN interface of the second router 104 by using the LAN interface, so as to implement a connection between the first router 102 and the second router 104. The second router 104 is also connected to a second terminal 105. It should be noted that similar to the first router 102, the second router 104 may also be connected to another router so as to implement multilevel cascading. If the first router 102 obtains only one server delegate prefix from the BAS 101, and the first router 102 may generate only one router local prefix according to the server delegate prefix, the first router 102 does not have a delegate prefix to be delivered to the second router 104, and therefore the second router 104 does not have a local prefix. Therefore, a device connected to the second router 104, that is, the second terminal 105, cannot obtain an IP address.

Embodiment 1

Figure 2:
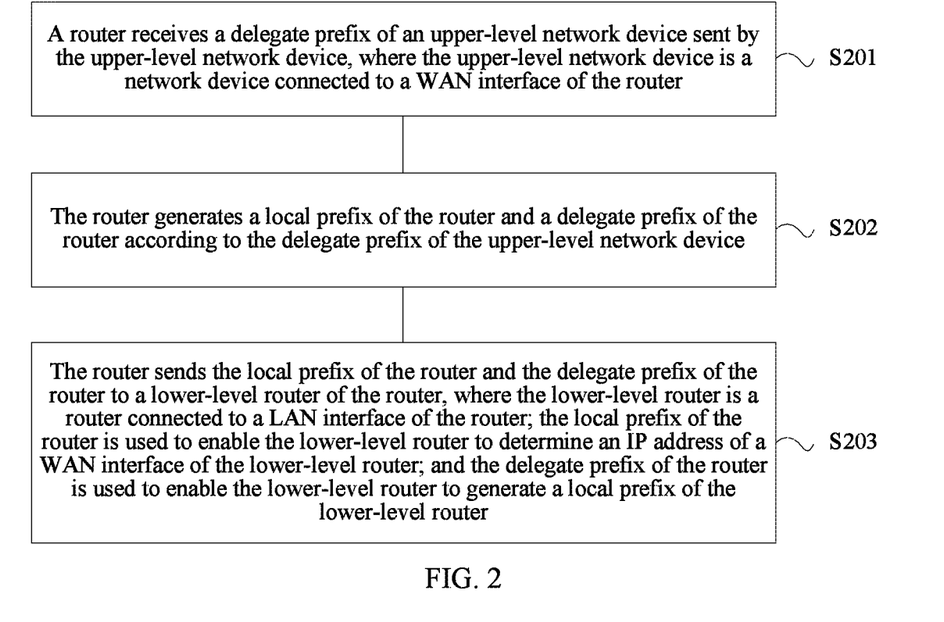
FIG. 2 is a flowchart of an Internet Protocol address allocation method according to Embodiment 1 of the present disclosure.

Embodiment 1 of the present disclosure provides an Internet Protocol address allocation method. The method may be performed by a router. FIG. 2 is a flowchart of an Internet Protocol address allocation method according to Embodiment 1 of the present disclosure. As shown in FIG. 2, the method may include the following steps.

S201: A router receives a delegate prefix of an upper-level network device sent by the upper-level network device, where the upper-level network device is a network device connected to a WAN interface of the router.

In an embodiment, the router may be any router having a lower-level router in an IPv6 cascaded network. The lower-level router may be a router connected by using a LAN interface of the router.

The router may receive a delegate prefix that is sent by the upper-level network device by using an identity association for prefix delegation (IA_PD) message of a dynamic host configuration protocol (DHCP) packet. In the IPv6 cascaded network, most devices, including terminals or routers, support an EUI with a 64-bit prefix; that is, in the IPv6 cascaded network, a prefix used for generating an IP address may have 64 bits. Therefore, in this embodiment, a length of the delegate prefix of the upper-level network device obtained by the router may be less than 64 bits. The delegate prefix of the upper-level network device may be used to represent a domain where each device, such as a terminal or a router, connected to the LAN interface of the router locate is located.

S202: The router generates a local prefix of the router and a delegate prefix of the router according to the delegate prefix of the upper-level network device.

The router may obtain the delegate prefix of the upper-level network device, and generate the local prefix of the router and the delegate prefix of the router according to the delegate prefix of the upper-level network device. A bit value of the local prefix of the router is different from a bit value of the delegate prefix of the router. In the IPv6 cascaded network, most devices support a 64-bit EUI. Therefore, a quantity of bits in the local prefix of the router is equal to a quantity of bits in the prefix of the EUI. A quantity of bits in the delegate prefix of the router may be less than or equal to the quantity of bits in the prefix of the EUI. The quantity of bits in the local prefix of the router may be equal to the quantity of bits in the prefix of the EUI.

For example, if the quantity of bits in the delegate prefix of the upper-level network device is 60 and the quantity of bits in the EUI is 64, the router may perform configuration on bits lower than the lowest bits of the delegate prefix of the upper-level network device, that is, the $61^{th}$ bit to the $64^{th}$ bit. The router may configure the $60^{th}$ bit of the delegate prefix of the upper-level network device to be a value different from that of the $60^{th}$ bit in the local prefix of the router, so as to obtain the delegate prefix of the router.

S203: The router sends the local prefix of the router and the delegate prefix of the router to a lower-level router of the router, where the lower-level router is a router connected to a LAN interface of the router; the local prefix of the router is used to enable the lower-level router to determine an IP address of a WAN interface of the lower-level router; and the delegate prefix of the router is used to enable the lower-level router to generate a local prefix of the lower-level router.

Optionally, the router may add the local prefix of the router to an identity association for non-temporary addresses (IA_NA) message of a router advertisement (RA) message or a DHCP packet, to send the local prefix of the router to the lower-level router. The lower-level router may be referred to as a cascaded router of the router. The router may add the delegate prefix of the router to an IA_PD message of the DHCP packet, to send the delegate prefix of the router to the lower-level router.

The lower-level router may obtain the local prefix of the router according to the RA message or an IA_NA message of the DHCP packet, and generate an IP address of a WAN interface of the lower-level router according to the local prefix of the router and a state identifier of the WAN interface of the lower-level router or a Media Access Control (MAC) address of the WAN interface of the lower-level router. In the IPv6 cascaded network, most devices support a 64-bit EUI, that is, in an IP address of a device, both a prefix and a suffix have 64 bits. Therefore, the state identifier of the WAN interface of the lower-level router or the MAC address of the WAN interface of the lower-level router is converted into an EUI address, that is, a 64-bit suffix, so as to generate the IP address of the WAN interface of the lower-level router according to the 64-bit local prefix of the router and the 64-bit suffix.

The lower-level router may obtain the delegate prefix of the router according to the IA_PD message of the DHCP packet and generate the local prefix of the lower-level router according to the delegate prefix of the router. The local prefix of the lower-level router may be used to enable the lower-level router to generate, according to the local prefix of the lower-level router and a state identifier of a terminal connected to the LAN interface of the lower-level router, an IP address of the terminal connected to the LAN interface of the lower-level router. It should be noted that before generating the IP address of the terminal connected to the LAN interface of the lower-level router, the lower-level router further needs to convert the state identifier of the terminal connected to the LAN interface of the lower-level router into an EUI address, that is, a 64-bit suffix.

Alternatively, the lower-level router may also send the local prefix of the lower-level router to a terminal connected to the LAN interface of the lower-level router, so that the terminal connected to the LAN interface of the lower-level router generates, according to the local prefix of the lower-level router and a MAC address of the terminal connected to the LAN interface of the lower-level router, the IP address of the terminal connected to the LAN interface of the lower-level router. It should be noted that before generating the IP address of the terminal connected to the LAN interface of the lower-level router, the terminal connected to the LAN interface of the lower-level router further needs to convert the MAC address of the terminal connected to the LAN interface of the lower-level router into a 64-bit suffix of an EUI address.

Embodiment 1 of the present disclosure provides an Internet Protocol address allocation method. A router may receive a delegate prefix of an upper-level network device sent by the upper-level network device, where the upper-level network device is a network device connected to a WAN interface of the router, generate a local prefix of the router and a delegate prefix of the router according to the delegate prefix of the upper-level network device, and send the local prefix of the router and the delegate prefix of the router to a lower-level router of the router, that is, a router connected to a LAN interface of the router. Because the local prefix of the router may be used to enable the lower-level router to determine an IP address of the WAN interface of the lower-level router, and the delegate prefix of the router is used to enable the lower-level router to determine an IP address of a terminal connected to the LAN interface of the lower-level router, IP addresses are allocated to devices in the cascaded network.

It should be noted that the Internet Protocol address allocation method provided in Embodiment 1 of the present disclosure may implement automatic obtaining of an IP address of a router or a terminal in a cascaded network without manual configuration by a manager, so that network maintenance of the cascaded network is more convenient and has higher accuracy.

Embodiment 2

Based on the foregoing method of Embodiment 1, Embodiment 2 of the present disclosure further provides an Internet Protocol address allocation method. Optionally, the upper-level network device in Embodiment 1 is a BAS or a router connected to a WAN interface of the router.

In an embodiment, if the upper-level network device is a BAS connected to the WAN interface of the router, a delegate prefix of the upper-level network device may be a server delegate prefix configured by the BAS according to an interface service of the router. If the upper-level network device is a router connected to the WAN interface of the router, the delegate prefix of the upper-level network device may be generated from a delegate prefix of another router that is sent by the another router and that is received by the router connected to the WAN interface of the router.

If the upper-level network device is a BAS connected to the WAN interface of the router, the router may be referred to as an ingress router, and the method of this embodiment may implement at least obtaining of an IP address of a device connected to a cascaded router in a first level of a cascaded network. If the upper-level router is a router connected to the WAN interface of the router, the router itself is a cascaded router, and in this case, the method of this embodiment may further implement obtaining of an IP address of a device connected to a cascaded router a multilevel cascaded network.

Optionally, in the foregoing step S202, that the router generates a local prefix of the router and a delegate prefix of the router according to the delegate prefix of the upper-level network device may include if the router starts a cascade mode, generating, by the router, the local prefix of the router and the delegate prefix of the router according to the delegate prefix of the upper-level network device.

The cascade mode refers to a corresponding connection mode which is between the router and the lower-level router and in which the lower-level router may transmit network data by using a connection to the network, where the connection is established by the router and the BAS.

Optionally, that the router generates a local prefix of the router and a delegate prefix of the router according to the delegate prefix of the upper-level network device may include configuring, by the router, a next bit of a lowest bit of the delegate prefix of the upper-level network device to be a first bit value and adding a random value after the next bit to obtain the local prefix of the router, so that a quantity of bits in the local prefix of the router is equal to a quantity of bits in a prefix of an EUI; and configuring, by the router, the next bit to be a second bit value and increasing the quantity of bits in the delegate prefix of the upper-level network device by one to obtain the delegate prefix of the router, where the first bit value is different from the second bit value.

In an embodiment, the first bit value may be 0 or 1. If the first bit value is 0, the second bit value is 1; correspondingly, if the first bit value is 1, the second bit value may be 0. For example, the router may configure a next bit of the lowest bit of the delegate prefix of the upper-level network device to be a bit value 0, to obtain the local prefix of the router, and configure the next bit of the lowest bit of the delegate prefix of the upper-level network device to be a bit value 1, to obtain the delegate prefix of the router. Alternatively, the router may configure a next bit of the lowest bit of the delegate prefix of the upper-level network device to be a bit value 1, to obtain the local prefix of the router, and configure the next bit of the lowest bit of the delegate prefix of the upper-level network device to be a bit value 0, to obtain the delegate prefix of the router.

Optionally, whether the router starts a cascade mode may be configured in advance. If the router starts the cascade mode, a LAN interface of the router is connected to another router, and the router may send an IA_PD message of a DHCP packet to the another router. That is, if the router starts the cascade mode, and another router, such as the lower-level router, is connected to the LAN interface of the router, the router may deliver the delegate prefix of the router to the another router by sending the IA_PD message of the DHCP packet.

If the router does not start the cascade mode, the router adds a random value after the lowest bit of the delegate prefix of the upper-level network device to obtain the local prefix of the router, and determines, according to the local prefix of the router, an IP address of a terminal connected to the router, or sends the local prefix of the router to a terminal connected to the router, so that the terminal connected to the router generates, according to the local prefix of the router, an IP address of the terminal connected to the router.

Optionally, the method further includes determining, by the router according to the local prefix of the router, an IP address of the terminal connected to the LAN interface of the router.

In an embodiment, the router may generate, according to the local prefix of the router or a state identifier allocated by the router to the terminal connected to the router, an IP address of the terminal connected to the router that has a state. The state identifier allocated by the router to the terminal connected to the router may be a number of the terminal connected to the router. Different terminals connected to the router have different numbers respectively, that is, different state identifiers.

Optionally, the method may include sending, by the router, the local prefix of the router to the terminal connected to the LAN interface of the router, where the local prefix of the router is used to enable the terminal connected to the LAN interface of the router to determine an IP address of the terminal connected to the LAN interface of the router.

The IP address of the terminal connected to the LAN interface of the router may be generated by converting a MAC address of the terminal connected to the LAN interface of the router into an EUI address, and generating, according to the EUI address obtained through conversion and the local prefix of the router, an IP address of the terminal connected to the LAN interface of the router that has a state.

Figure 3:
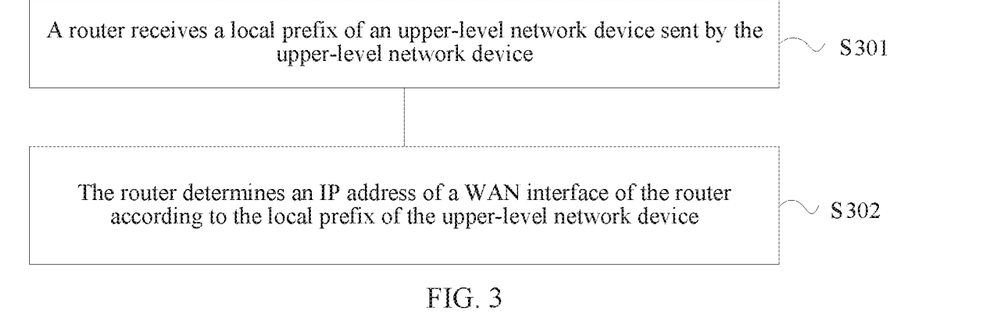
FIG. 3 is a flowchart of an Internet Protocol address allocation method according to Embodiment 2 of the present disclosure.

Embodiment 2 of the present disclosure further provides an Internet Protocol address allocation method. FIG. 3 is a flowchart of an Internet Protocol address allocation method according to Embodiment 2 of the present disclosure. As shown in FIG. 3, the method further includes the following steps.

S301: A router receives a local prefix of an upper-level network device sent by the upper-level network device.

The router may receive the local prefix of the upper-level network device that is sent by the upper-level network device by using an RA message or an IA_NA message of a DHCP packet.

S302: The router determines an IP address of a WAN interface of the router according to the local prefix of the upper-level network device.

A specific implementation process of determining the IP address of the WAN interface of the router by the router according to the local prefix of the upper-level network device is similar to that of determining the IP address of the WAN interface of the lower-level router by the lower-level router according to the local prefix of the router, and details are not described herein again.

The Internet Protocol address allocation method provided in Embodiment 2 of the present disclosure can make an IP address of a device connected to a cascaded router in a cascaded network more accurate and ensure normal transmission of data of the cascaded network.

Embodiment 3

Figure 4:
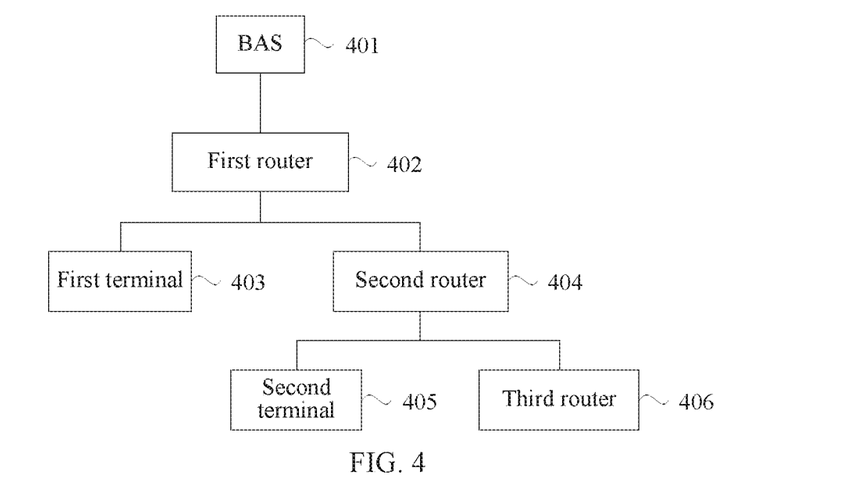
FIG. 4 is a schematic structural diagram of a cascaded network according to Embodiment 3 of the present disclosure.

Embodiment 3 of the present disclosure further provides an Internet Protocol address allocation method. FIG. 4 is a schematic structural diagram of a cascaded network according to Embodiment 3 of the present disclosure. As shown in FIG. 4, in the cascaded network, a BAS 401 is connected to a WAN interface of a first router 402. One LAN interface of the first router 402 is connected to a first terminal 403, and another LAN interface of the first router 402 is connected to a WAN interface of a second router 404. One LAN interface of the second router 404 is connected to a second terminal 405, and another LAN interface of the second router 404 is connected to a WAN interface of a third router 406. It should be noted that a LAN interface of the third router 406 may be connected to another terminal or router so as to implement multilevel cascading.

FIG. 5 is a flowchart of an Internet Protocol address allocation method according to Embodiment 3 of the present disclosure. As shown in FIG. 5, the method may include the following steps.

S501: A BAS determines a local prefix of the BAS and a delegate prefix of the BAS according to an RA message sent by a first router.

The local prefix of the BAS may be expressed by using the local prefix of the BAS and a length of the local prefix of the BAS. For example, the local prefix of the BAS may be expressed as 2014::/64, that is, the length of the local prefix of the BAS is 64-bit.

A quantity of bits in the delegate prefix of the BAS may be less than a quantity of bits in a prefix of an EUI, such as 64 bits. The delegate prefix of the BAS may have, for example, 60 bits. The delegate prefix of the BAS may be expressed as 2014:1010::/60.

S502: The BAS adds the local prefix of the BAS to an RA message or an IA_NA message of a DHCP and sends the local prefix of the BAS to the first router, and adds the delegate prefix of the BAS to an IA_PD message of the DHCP and sends the delegate prefix of the BAS to the first router.

S503: The first router generates an IP address of a WAN interface of the first router according to the local prefix of the BAS.

The first router may generate the IP address of the WAN interface of the first router according to the local prefix of the BAS and a state identifier of the first router. If the state identifier of the first router is 1, the IP address of the WAN interface of the first router may be expressed as 2014::1.

S504: If the first router starts a cascade mode, the first router configures a next bit of a lowest bit of the delegate prefix of the BAS to be a bit value 0, and adds a random value to the next bit of the lowest bit of the delegate prefix of the BAS, to obtain a local prefix of the first router, so that a quantity of bits in the local prefix of the first router is equal to a quantity of bits in a prefix of an EUI.

S505: The first router configures the next bit of the lowest bit of the delegate prefix of the BAS to be a bit value 1, and increases a quantity of bits in the delegate prefix of the BAS by one, to obtain the delegate prefix of the first router.

The quantity of bits in the delegate prefix of the BAS is 60, and the quantity of bits in the prefix of the EUI is 64. Therefore, the first router may configure a next bit of the lowest bit of the delegate prefix of the BAS, that is, the $61^{th}$ bit, to be 0, and configure the $62^{th}$ bit to the $64^{th}$ bit according to a random number, to obtain the local prefix of the first router. For example, the local prefix of the first router may be expressed as 2014:1010::0003/64. Values of the $62^{th}$ bit to the $64^{th}$ bit of the local prefix of the first router, namely, 011, are a random number. The quantity of bits in the local prefix of the first router may be equal to the quantity of bits in the prefix of the EUI, such as 64 bits.

The first router may configure the $61^{th}$ bit of the delegate prefix of the BAS to be a bit value 1, and increase the quantity of bits in the delegate prefix of the BAS by one, to obtain the delegate prefix of the first router. For example, the delegate prefix of the first router may be expressed as 2014:1010::0008/61.

S506: The first router generates an IP address of a first terminal according to the local prefix of the first router.

The first router generates the IP address of the first terminal according to the local prefix of the first router and a state identifier allocated by the first router to the first terminal. If the state identifier of the first terminal is 2, the IP address of the first terminal may be expressed as 2014:1010:0003::2.

S507: The first router adds the local prefix of the first router to an RA message or an IA_NA message of a DHCP and sends the local prefix of the first router to a second router, and adds the delegate prefix of the first router to an IA_PD message of the DHCP and sends the delegate prefix of the first router to the second router.

S508: The second router generates an IP address of a WAN interface of the second router according to the local prefix of the first router.

The second router may generate the IP address of the WAN interface of the second router according to the local prefix of the first router and a state identifier of the second router. If the state identifier of the second router is 1, the IP address of the WAN interface of the second router may be expressed as 2014:1010:0003::1.

S509: If the second router starts a cascade mode, the second router configures a next bit of a lowest bit of the delegate prefix of the first router to be a bit value 0, and adds a random value after the next bit of the lowest bit of the delegate prefix of the first router, to obtain a local prefix of the second router, so that a quantity of bits in the local prefix of the second router is equal to the quantity of bits in the prefix of the EUI.

S510: The second router configures the next bit of the lowest bit of the delegate prefix of the first router to be a bit value 1, and increases the quantity of bits in the delegate prefix of the first router by one, to obtain a delegate prefix of the second router.

The quantity of bits in the delegate prefix of the first router is 61. Therefore, the second router may configure the next bit of the lowest bit of the delegate prefix of the first router, that is, the $62^{th}$ bit, to be a bit value 0, and configure the $63^{th}$ bit to the $64^{th}$ bit to be a random number, to obtain the local prefix of the second router. For example, the local prefix of the second router may be expressed as 2014:1010::0009/64, and the values 01 of the $63^{th}$ bit to the $64^{th}$ bit of the local prefix of the second router are a random number.

The second router may configure the $62^{th}$ bit of the delegate prefix of the first router to be a bit value 1, and increase the delegate prefix of the first router by one, to obtain the delegate prefix of the second router. For example, the delegate prefix of the second router may be expressed as 2014:1010::000C/62.

S511: The second router generates an IP address of a second terminal according to the local prefix of the second router.

The second router generates the IP address of the second terminal according to the local prefix of the second router and a state identifier allocated by the second router to the second terminal. If the state identifier of the second terminal is 2, the IP address of the second terminal may be expressed as 2014:1010:0009::2.

S512: The second router adds the local prefix of the second router to an RA message or an IA_NA message of a DHCP and sends the local prefix of the second router to a third router.

S513: The third router generates an IP address of a WAN interface of the third router according to the local prefix of the second router.

The third router may generate the IP address of the WAN interface of the third router according to the local prefix of the second router and a state identifier of the third router. If the state identifier of the third router is 1, the IP address of the WAN interface of the third router may be expressed as 2014:1010:0009::1.

The Internet Protocol address allocation method provided in Embodiment 3 of the present disclosure describes the method in any one of the foregoing embodiments by using specific examples, beneficial effects of Embodiment 3 are similar to those of the foregoing embodiments, and details are not described herein again.

Embodiment 4

Figure 6:
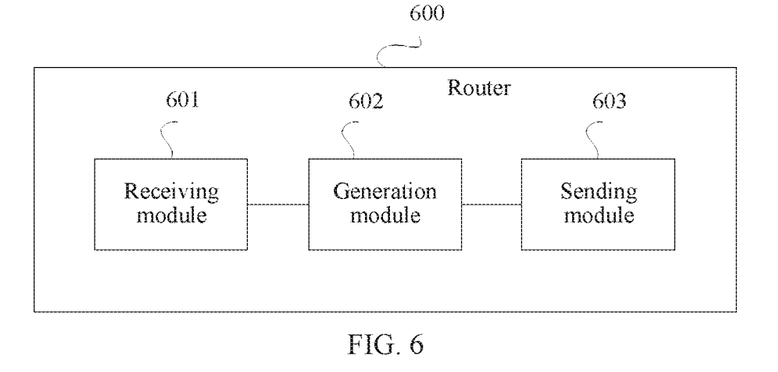
FIG. 6 is a schematic structural diagram of a router according to Embodiment 4 of the present disclosure.

Embodiment 4 of the present disclosure further provides a router. The router may perform an Internet Protocol address allocation method in any embodiment of the foregoing Embodiment 1 to Embodiment 3. FIG. 6 is a schematic structural diagram of a router according to Embodiment 4 of the present disclosure. As shown in FIG. 6, a router 600 may include a receiving module 601, a generation module 602, and a sending module 603.

The receiving module 601 is configured to receive a delegate prefix of an upper-level network device sent by the upper-level network device, where the upper-level network device is a network device connected to a WAN interface of the router.

The generation module 602 is configured to generate a local prefix of the router and a delegate prefix of the router according to the delegate prefix of the upper-level network device.

The sending module 603 is configured to send the local prefix of the router and the delegate prefix of the router to a lower-level router of the router, where the lower-level router is a router connected to a LAN interface of the router; the local prefix of the router is used to enable the lower-level router to determine an IP address of a WAN interface of the lower-level router; and the delegate prefix of the router is used to enable the lower-level router to generate a local prefix of the lower-level router.

Optionally, the upper-level network device is a BAS or a router connected to a WAN interface of the router.

Optionally, the generation module 602 is further configured to if the router starts a cascade mode, generate the local prefix of the router and the delegate prefix of the router according to the delegate prefix of the upper-level network device.

Optionally, the generation module 602 is further configured to configure a next bit of a lowest bit of the delegate prefix of the upper-level network device to be a first bit value, and add a random value after the next bit to obtain the local prefix of the router, so that a quantity of bits in the local prefix of the router is equal to a quantity of bits in a prefix of an EUI; and configure the next bit to be a second bit value and increase the quantity of bits in the delegate prefix of the upper-level network device by one to obtain the delegate prefix of the router, where the first bit value is different from the second bit value.

Optionally, the quantity of bits in the delegate prefix of the upper-level network device is less than the quantity of bits in the prefix of the EUI.

The router provided in Embodiment 4 of the present disclosure may perform the Internet Protocol address allocation method in any embodiment of the foregoing Embodiment 1 to Embodiment 3. The beneficial effects of Embodiment 4 are similar to those of the foregoing embodiment, and details are not described herein again.

Embodiment 5

Figure 7:
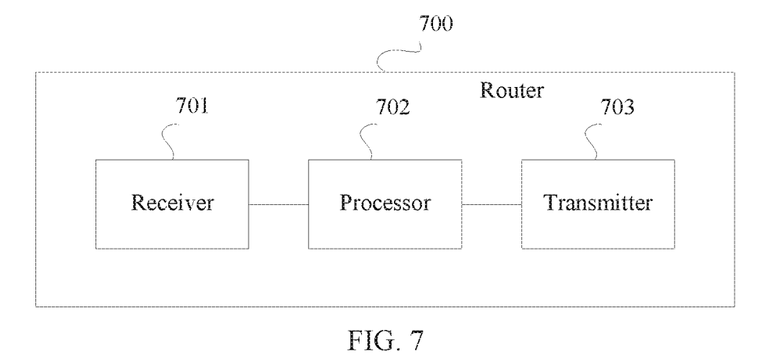
FIG. 7 is a schematic structural diagram of a router according to Embodiment 5 of the present disclosure.

Embodiment 5 of the present disclosure further provides a router. FIG. 7 is a schematic structural diagram of a router according to Embodiment 5 of the present disclosure. As shown in FIG. 7, a router 700 may include a receiver 701, a processor 702, and a transmitter 703.

The receiver 701 is configured to receive a delegate prefix of an upper-level network device sent by the upper-level network device, where the upper-level network device is a network device connected to a WAN interface of the router.

The processor 702 is configured to generate a local prefix of the router and a delegate prefix of the router according to the delegate prefix of the upper-level network device.

The transmitter 703 is configured to send the local prefix of the router and the delegate prefix of the router to a lower-level router of the router, where the lower-level router is a router connected to a LAN interface of the router; the local prefix of the router is used to enable the lower-level router to determine an IP address of a WAN interface of the lower-level router; and the delegate prefix of the router is used to enable the lower-level router to generate a local prefix of the lower-level router.

Optionally, the upper-level network device is a BAS or a router connected to a WAN interface of the router.

Optionally, the processor 702 is further configured to if the router starts a cascade mode, generate the local prefix of the router and the delegate prefix of the router according to the delegate prefix of the upper-level network device.

Optionally, the processor 702 is further configured to configure a next bit of a lowest bit of the delegate prefix of the upper-level network device to be a first bit value, and add a random value after the next bit to obtain the local prefix of the router, so that a quantity of bits in the local prefix of the router is equal to a quantity of bits in a prefix of an EUI; and configure the next bit to be a second bit value and increase the quantity of bits in the delegate prefix of the upper-level network device by one to obtain the delegate prefix of the router. The first bit value is different from the second bit value.

Optionally, the quantity of bits in the delegate prefix of the upper-level network device is less than the quantity of bits in the prefix of the EUI.

The router provided in Embodiment 5 of the present disclosure may perform the Internet Protocol address allocation method in any embodiment of the foregoing Embodiment 1 to Embodiment 3. The beneficial effects of Embodiment 4 are similar to those of the foregoing embodiment, and details are not described herein again.

Embodiment 6

Figure 8:
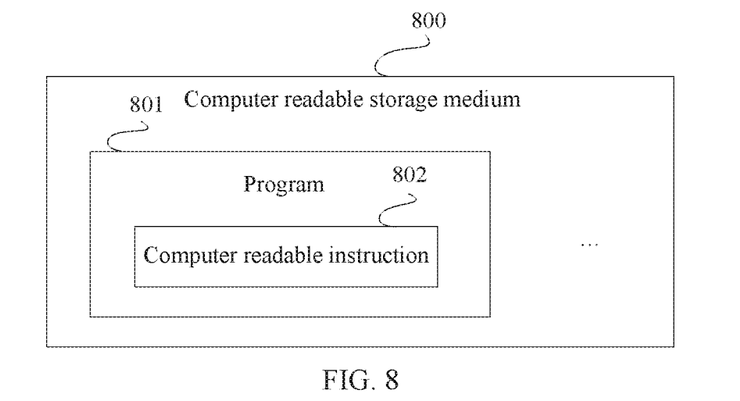
FIG. 8 is a schematic structural diagram of a computer readable storage medium according to Embodiment 6 of the present disclosure.

Embodiment 6 of the present disclosure further provides a computer readable storage medium. FIG. 8 is a schematic structural diagram of a computer readable storage medium according to Embodiment 6 of the present disclosure. As shown in FIG. 8, the computer readable storage medium 800 includes at least one program 801, where the at least one program includes a computer readable instruction 802.

The computer readable instruction 802 is configured to be invoked and executed by a processor of a router, so as to receive a delegate prefix of an upper-level network device sent by the upper-level network device, generate a local prefix of the router and a delegate prefix of the router according to the delegate prefix of the upper-level network device, and send the local prefix of the router and the delegate prefix of the router to a lower-level router of the router, where the upper-level network device is a network device connected to a WAN interface of the router; the lower-level router is a router connected to a LAN interface of the router; the local prefix of the router is used to enable the lower-level router to determine an IP address of a WAN interface of the lower-level router; and the delegate prefix of the router is used to enable the lower-level router to generate a local prefix of the lower-level router.

Optionally, the upper-level network device is a BAS or a router connected to a WAN interface of the router.

Optionally, the computer readable instruction 802 is further configured to be invoked and executed by the processor of the router when the router starts a cascade mode, so as to generate the local prefix of the router and the delegate prefix of the router according to the delegate prefix of the upper-level network device.

Optionally, the computer readable instruction 802 is further configured to be invoked and executed by the processor of the router, so as to configure a next bit of a lowest bit of the delegate prefix of the upper-level network device to be a first bit value, and add a random value after the next bit to obtain the local prefix of the router, so that a quantity of bits in the local prefix of the router is equal to a quantity of bits in a prefix of an EUI; and configure the next bit to be a second bit value and increase the quantity of bits in the delegate prefix of the upper-level network device by one to obtain the delegate prefix of the router, where the first bit value is different from the second bit value.

Optionally, the quantity of bits in the delegate prefix of the upper-level network device is less than the quantity of bits in the prefix of the EUI.

The computer readable storage medium provided in Embodiment 6 of the present disclosure may include at least one program of a computer readable instruction, and the at least one program is configured to be invoked and executed by a processor of a router, so as to implement the Internet Protocol address allocation method in any one of the foregoing Embodiment 1 to Embodiment 3. Beneficial effects of Embodiment 6 are similar to those of the foregoing embodiments, and details are not described herein again.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An Internet Protocol address allocation method comprising:
receiving, by a router, a first delegate prefix of an upper-level network device sent by the upper-level network device, wherein the upper-level network device is a network device connected to a wide area network (WAN) interface of the router;
generating, by the router, a local prefix of the router and a second delegate prefix of the router according to the first delegate prefix of the upper-level network device, wherein generating the local prefix of the router and the second delegate prefix of the router comprises:
increasing, by the router, a quantity of bits in the first delegate prefix of the upper-level network device by one to obtain the second delegate prefix of the router; and
sending, by the router, the local prefix of the router and the second delegate prefix of the router to a lower-level router of the router, wherein the lower-level router is a router connected to a local area network (LAN) interface of the router; wherein the local prefix of the router enables the lower-level router to determine an Internet Protocol (IP) address of a WAN interface of the lower-level router; and the second delegate prefix of the router enables the lower-level router to generate a local prefix of the lower-level router.

2. The method of claim 1, wherein the upper-level network device is a broadband access server (BAS) connected to the WAN interface of the router.

3. The method of claim 1, wherein generating the local prefix of the router and the second delegate prefix of the router comprises generating, by the router, the local prefix of the router and the second delegate prefix of the router according to the first delegate prefix of the upper-level network device, when the router starts a cascade mode.

4. The method of claim 3, wherein generating the local prefix of the router and the second delegate prefix of the router comprises:
configuring, by the router, a next bit of a lowest bit of the first delegate prefix of the upper-level network device to be a first bit value;
adding, by the router, a random value after the next bit to obtain the local prefix of the router, wherein a quantity of bits in the local prefix of the router is equal to a quantity of bits in a prefix of an end-system unique identifier (EUI);
configuring, by the router, the next bit to be a second bit value; and
wherein the first bit value is different from the second bit value.

5. The method of claim 4, wherein the quantity of bits in the first delegate prefix of the upper-level network device is less than the quantity of bits in the prefix of the EUI.

6. The method of claim 1, wherein the upper-level network device is a router connected to the WAN interface of the router.

7. A router comprising:
at least one processor; and
a non-transitory computer-readable storage medium coupled to the at least one processor and storing programming instructions for execution by the at least one processor, the programming instructions instruct the at least one processor to perform operations comprising:
receiving a first delegate prefix of an upper-level network device sent by the upper-level network device, wherein the upper-level network device is a network device connected to a wide area network (WAN) interface of the router;
generating a local prefix of the router and a second delegate prefix of the router according to the first delegate prefix of the upper-level network device, wherein generating the local prefix of the router and the second delegate prefix of the router comprises:
increasing a quantity of bits in the first delegate prefix of the upper-level network device by one to obtain the second delegate prefix of the router; and
sending the local prefix of the router and the second delegate prefix of the router to a lower-level router of the router, wherein the lower-level router is a router connected to a local area network (LAN) interface of the router; wherein the local prefix of the router enables the lower-level router to determine an Internet Protocol (IP) address of a WAN interface of the lower-level router; and the second delegate prefix of the router enables the lower-level router to generate a local prefix of the lower-level router.

8. The router of claim 7, wherein the upper-level network device is a broadband access server (BAS) or a router connected to the WAN interface of the router.

9. The router of claim 7, wherein generating the local prefix of the router and the second delegate prefix of the router comprises generating the local prefix of the router and the second delegate prefix of the router according to the first delegate prefix of the upper-level network device, when the router starts a cascade mode.

10. The router of claim 9, wherein generating the local prefix of the router and the second delegate prefix of the router comprises:
configuring a next bit of a lowest bit of the first delegate prefix of the upper-level network device to be a first bit value;
adding a random value after the next bit to obtain the local prefix of the router, wherein a quantity of bits in the local prefix of the router is equal to a quantity of bits in a prefix of an end-system unique identifier (EUI);
configuring the next bit to be a second bit value; and
wherein the first bit value is different from the second bit value.

11. The router of claim 10, wherein the quantity of bits in the first delegate prefix of the upper-level network device is less than the quantity of bits in the prefix of the EUI.

12. A router comprising:
a receiver configured to receive a first delegate prefix of an upper-level network device sent by the upper-level network device, wherein the upper-level network device is a network device connected to a wide area network (WAN) interface of the router;
a processor configured to generate a local prefix of the router and a second delegate prefix of the router according to the first delegate prefix of the upper-level network device, wherein the processor is configured to increase a quantity of bits in the first delegate prefix of the upper-level network device by one to obtain the second delegate prefix of the router; and
a transmitter configured to send the local prefix of the router and the second delegate prefix of the router to a lower-level router of the router, wherein the lower-level router is a router connected to a local area network (LAN) interface of the router; wherein the local prefix of the router enables the lower-level router to determine an Internet Protocol (IP) address of a WAN interface of the lower-level router; and the second delegate prefix of the router enables the lower-level router to generate a local prefix of the lower-level router.

13. The router of claim 12, wherein the upper-level network device is a broadband access server (BAS) or a router connected to the WAN interface of the router.

14. The router of claim 12, wherein the processor is further configured to generate the local prefix of the router and the second delegate prefix of the router according to the first delegate prefix of the upper-level network device, when the router starts a cascade mode.

15. The router of claim 14, wherein the processor is further configured to:
configure a next bit of a lowest bit of the first delegate prefix of the upper-level network device to be a first bit value;
add a random value after the next bit to obtain the local prefix of the router, wherein a quantity of bits in the local prefix of the router is equal to a quantity of bits in a prefix of an end-system unique identifier (EUI);
configure the next bit to be a second bit value; and
wherein the first bit value is different from the second bit value.

16. The router of claim 15, wherein the quantity of bits in the first delegate prefix of the upper-level network device is less than the quantity of bits in the prefix of the EUI.

* * * * *